United States Patent
DiMarco et al.

(10) Patent No.: US 6,425,065 B2
(45) Date of Patent: Jul. 23, 2002

(54) TAG RAM WITH SELECTION MODULE FOR A VARIABLE WIDTH ADDRESS FIELD

(75) Inventors: David DiMarco, Hillsboro, OR (US); Jeffrey L. Miller, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 09/002,165

(22) Filed: Dec. 31, 1997

(51) Int. Cl.[7] .............................................. G06F 12/04
(52) U.S. Cl. ....................... 711/212; 711/220; 711/104; 711/203
(58) Field of Search ................................. 711/212, 220, 711/3, 104, 203, 128

(56) References Cited

U.S. PATENT DOCUMENTS

| | | | | |
|---|---|---|---|---|
| 5,600,814 A | * | 2/1997 | Gahan et al. ............... | 395/427 |
| 5,617,554 A | * | 4/1997 | Alpert et al. ............... | 395/418 |
| 5,793,994 A | * | 8/1998 | Mitchell et al. ............ | 395/306 |
| 5,802,605 A | * | 9/1998 | Alpert et al. ............... | 711/208 |
| 5,913,228 A | * | 6/1999 | Bedarida ..................... | 711/170 |
| 6,000,014 A | * | 12/1999 | Arimilli et al. ............. | 711/128 |
| 6,014,732 A | * | 1/2000 | Naffziger .................... | 711/203 |

* cited by examiner

Primary Examiner—Matthew Kim
Assistant Examiner—Brian R. Peugh
(74) Attorney, Agent, or Firm—Kenyon & Kenyon

(57) ABSTRACT

A tag RAM is coupled to an address bus that is adapted to carry a variable width address field. The tag RAM includes a memory section coupled to the address bus and a comparator coupled to the address bus and the memory section. The tag RAM further includes a selection module coupled to the address bus and coupled to the comparator. The selection module selects one or more bits of the address field as tag field bits depending on the width of the address field and the size of the cache memory coupled to the tag RAM.

30 Claims, 3 Drawing Sheets

TAG RAM WITH SELECTION MODULE FOR A VARIABLE WIDTH ADDRESS FIELD

FIELD OF THE INVENTION

The present invention is directed to a computer cache subsystem. More particularly, the present invention is directed to a cache subsystem that includes a tag RAM with a selection module for a variable width address field.

BACKGROUND OF THE INVENTION

Most computer systems today include a cache subsystem in addition to a main memory. The main memory is typically populated with relatively slow access, low cost dynamic random access memory ("DRAM") while the cache subsystem is typically populated with a relatively small amount of high cost, fast access static random access memory ("SRAM") that functions as cache memory. The cache subsystem stores copies of frequently accessed information read from the main memory by the computer system's processor.

In a typical cache subsystem, a subset of the information from main memory is stored in cache memory in the form of memory lines. Each line is identified uniquely by its memory address, which is divided into a set portion and a tag portion. The set portion identifies the specific location or "set" in cache memory where the line must be stored. The tag portion identifies a line stored in cache memory. Tags are stored in a separate tag random access memory ("tag RAM") within the cache subsystem.

The cache subsystem and main memory in a computer system are coupled to an address bus. This can be a shared or separate address bus. An address bus includes multiple address bus bits, referred to as the "address field." In the typical computer system, the size of the address field width coupled to the cache subsystem is fixed. During a cache subsystem operation, the address field received by the cache is partitioned into a tag field and a set field. The set field identifies a set location in the cache memory. The tag field is stored in the tag RAM and identifies which sets are stored in the cache.

Some computer systems allow the amount of cache memory in the cache subsystem to be variable. However, the cache subsystems in these computer systems only support a fixed address field width because of the design of their tag RAM. For example, in computer systems designed around some processors from Intel Corp. that have a fixed width 24 bit wide address field, the amount of cache memory in the level 2 ("L2") cache subsystem can be either 256 KB or 512 KB. When the cache memory equals 256 KB, the tag field is fixed at 13 bits wide and the set field is fixed at 11 bits wide. When the cache memory equals 512 KB, the set field is increased to 12 bits, which, because the address field is fixed, requires the tag field to be decreased to 12 bits.

A problem with these known variable cache memory arrangements is that the tag RAM is not fully utilized. For example, because the tag field can be up to 13 bits wide, the physical size of the tag RAM must be at least 13 bits wide. However, when the tag field is reduced to 12 bits, portions of the 13 bit wide tag RAM are unused. Further, because the tag RAM only supports a fixed address field width, the maximum amount of addressable main memory available to the processor is also fixed (i.e., the maximum amount of addressable main memory equals $2^{(address\ field\ width)}$).

Based on the foregoing, there is a need for a cache subsystem that accommodates variable cache memory sizes and a variable width address field, while fully utilizing its tag RAM.

SUMMARY OF THE INVENTION

One embodiment of the present invention is a tag RAM coupled to an address bus adapted to carry a variable width address field. The tag RAM includes a memory section coupled to the address bus and a comparator coupled to the address bus and the memory section. The tag RAM further includes a selection module coupled to the address bus and coupled to the comparator.

DETAILED DESCRIPTION

Figure 1:
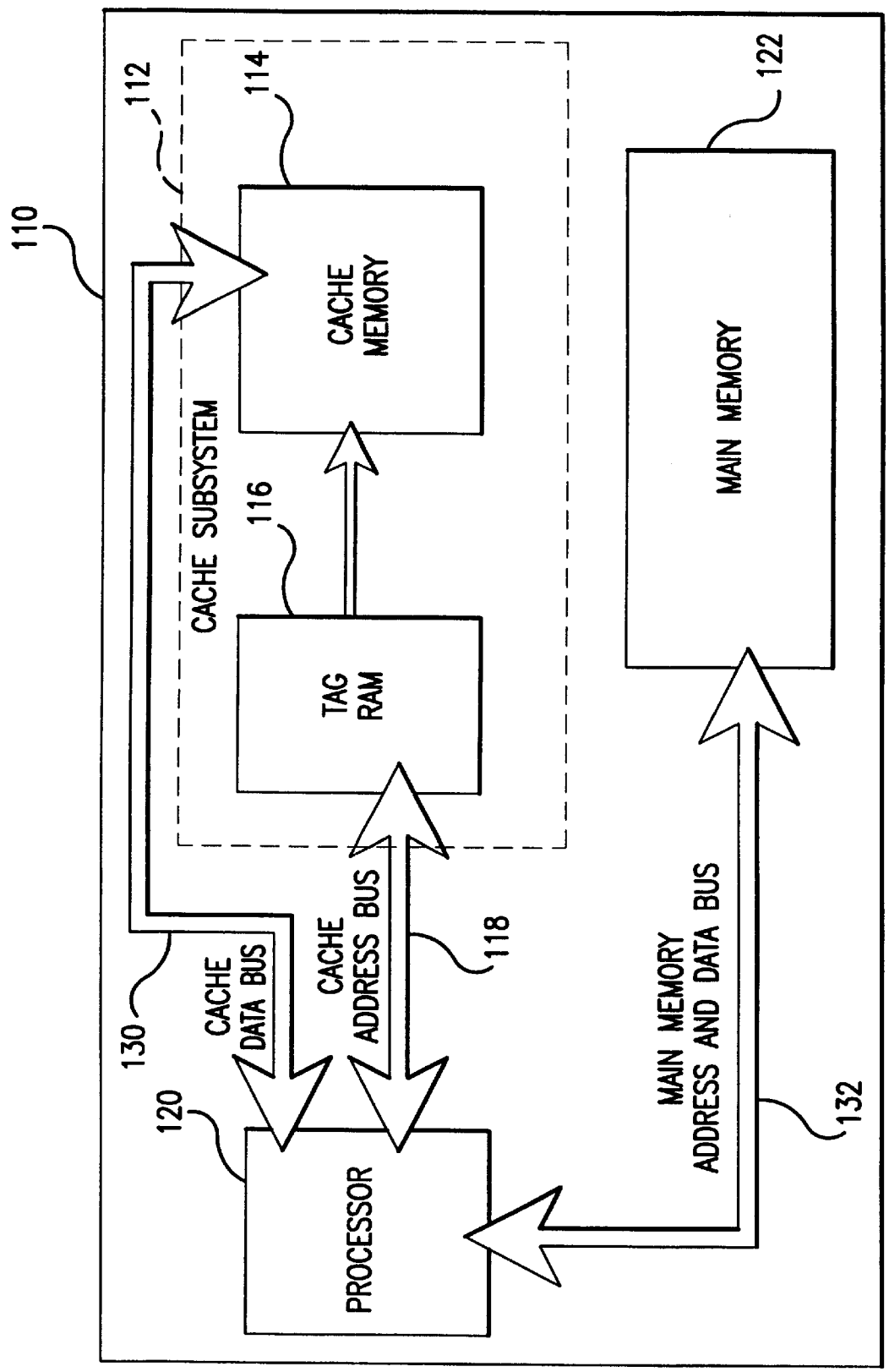
FIG. 1 is a block diagram of a computer system that implements one embodiment of the present invention.

FIG. 1 is a block diagram of a computer system 110 that implements one embodiment of the present invention. Computer system 110 includes a processor 120 coupled to a cache subsystem 112 via a cache address bus 118 and coupled to a main memory 122 via a main memory address bus 132. In other embodiments of the present invention, a single address bus couples processor 120 to both cache subsystem 112 and main memory 122.

Cache address bus 118 carries a plurality of address bus bits which form an address field. The address field of address bus 118 has a variable width. In one embodiment, the width of the address field can be either 24 or 25 bits wide. In another embodiment, the width of the address field can be 24–26 bits wide.

Cache subsystem 112 includes a tag RAM 116 coupled to a cache memory 114. As with the prior art cache subsystems previously described, memory lines from main memory 122 are stored in cache memory 114. Cache memory 114 is divided into a plurality of locations or "sets." Tag RAM 116 stores a tag for each memory line stored in cache memory 114. A cache data bus 130 carries data between processor 120 and cache memory 114.

Figure 2:
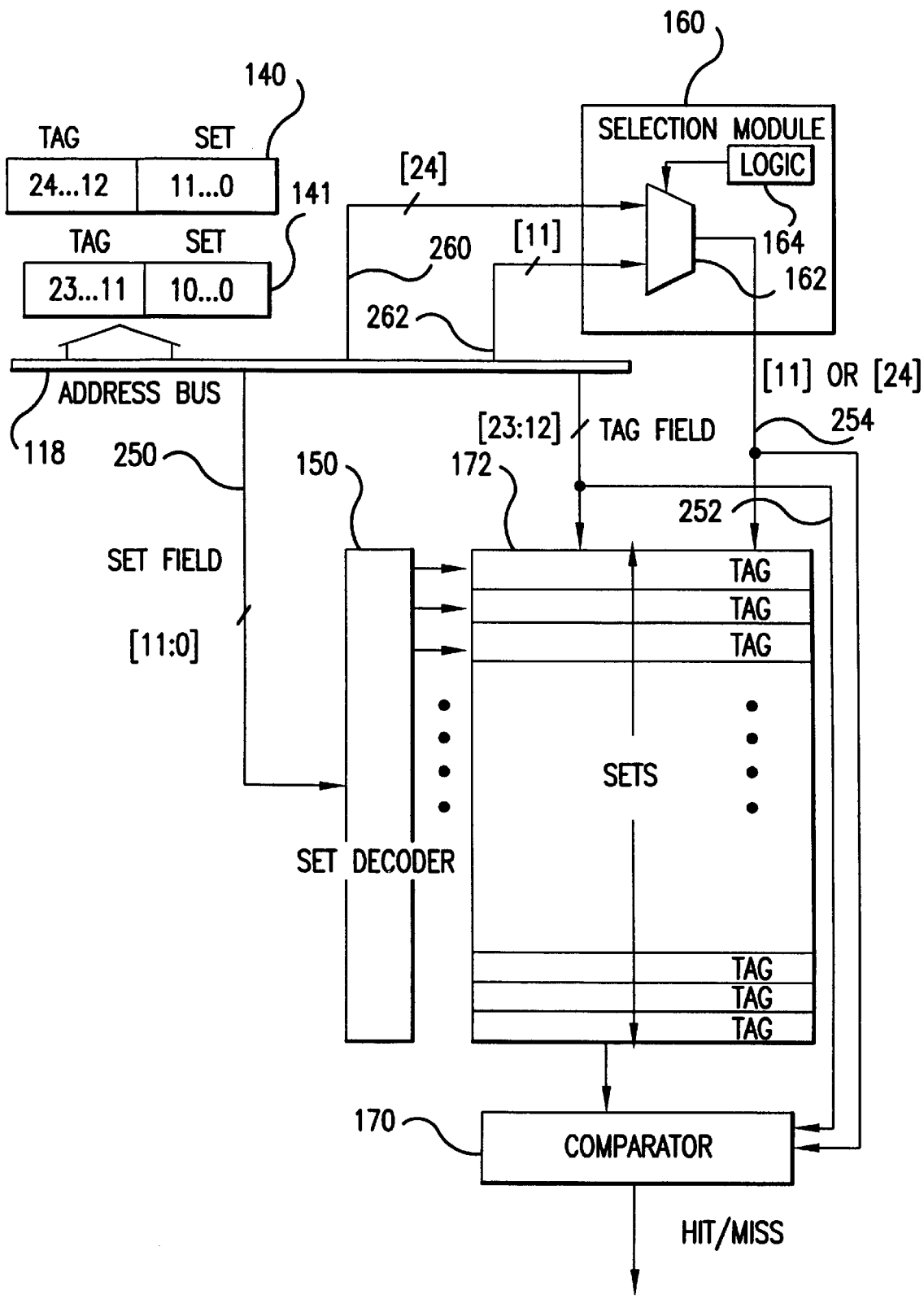
FIG. 2 is a detailed block diagram of a tag RAM in accordance with one embodiment of the present invention.

FIG. 2 is a detailed block diagram of tag RAM 116 in accordance with one embodiment of the present invention. Tag RAM 116 receives as an input the address field on address bus 118 from processor 120 of FIG. 1. The address field includes a set field and a tag field. In the present invention, the set field and tag field comprise contiguous bits, and the tag field is comprised of a fixed number of bits. In one embodiment, the tag field is 13 bits wide.

The two possible formats of the address field of one embodiment of the present invention are illustrated in FIG. 2. Address field 141 is 24 bits wide. The set field is the first 11 contiguous bits, designated as address field [10:0]. The tag field is the next 13 contiguous bits, or address field [23:11]. Address field 140 is expanded to 25 bits wide, with a 12 bit set field [11:0] and a 13 bit tag field [24:12]. For the purposes of this application, the bit or bits that are added to the address field when the address field is expanded (e.g., bit [24] when the address field is expanded to 25 bits) are referred to as the "expanded bits" of the address field.

Address fields 141 and 140 illustrate how the variable width address field allows the number of sets, and consequently the amount of cache memory supported, to be increased without decreasing the tag field. Specifically, address field 141 has an 11 bit set field so it supports 2 K of sets (i.e., $2^{11}$) while address field 140, with a 12 bit set field, supports 4 K of sets (i.e., $2^{12}$). Both address fields 140 and 141 have 13 bit tag fields, so that tag RAM 116, which includes a 13 bit wide tag memory section 172, can be fully utilized.

Tag memory section 172 is divided into a plurality of sets. Each set in tag memory section 172 corresponds to a set in cache memory 114 of FIG. 1. Each set in tag memory section 172 stores a tag of a memory line stored in the corresponding set of cache memory 114.

Tag memory section 172 is coupled to a set decoder 150. Set decoder 150 receives as an input over line 250 all bits that may comprise a set field on address bus 118. Therefore, in the embodiment shown in FIG. 2, set decoder 150 receives bits [11:0]. Set decoder 150 decodes the set field and selects one of the sets of tag memory section 172.

Tag memory section 172 is further coupled to a comparator 170. During read operations by processor 120, the tag field is input to comparator 170 over lines 252 and 254, and compared with the contents of the set in memory section 172 selected by set decoder 150. If there is a match, the desired memory line is stored in cache memory 114, producing a cache "hit". If there is not a match, the desired memory line is not stored in cache memory 114, producing a cache "miss." With a miss, the processor must retrieve the memory line from main memory 122. The tag field is also input to tag memory section 172 when a new memory line is stored in cache memory 114 (e.g., to update the cache following a cache miss). The tag field is the tag for the memory line and is stored in the selected set of tag memory section 172.

One problem with varying the address field is that frequently one or more bits of the address field switch from tag field bits to set field bits, or vice versa. For example, bit [11] is a tag field bit in address field 141, and is a set field bit in address field 140. For the purposes of this application, the bits in the address field that vary between the tag field and set field are referred to as the "variable bits" of the address field.

In order to overcome this problem, in one embodiment of the present invention the tag field input to tag memory section 172 and comparator 170 consists of two parts. One part includes the bits of the address field that are always tag field bits. Thus, for address fields 140 and 141, bits [23:12] make up the first part of the tag field. The other part of the tag field is the output of a selection module 160.

Selection module 160 includes a logic section 164 and multiplexer 162. One input of multiplexer 162 receives the expanded bit of the address field (i.e., bit [24]) over line 260. The other input of multiplexer 162 receives the variable bit of the address field (i.e., bit [11]) over line 262. The output of multiplexer 162 is input to tag memory section 172 and comparator 170 over line 254.

Logic section 164 is coupled to the selector input of multiplexer 162. Logic section 164 selects the input bit of multiplexer 162 that is a tag field bit for all formats of the address field. Therefore, logic section 164 selects bit [11] if address field 141 is the input, and bit [24] if address field 140 is the input. In one embodiment, logic section 164 is a lookup table or programmable register that provides the tag field bits based on the width of the address field and the cache size.

Figure 3:
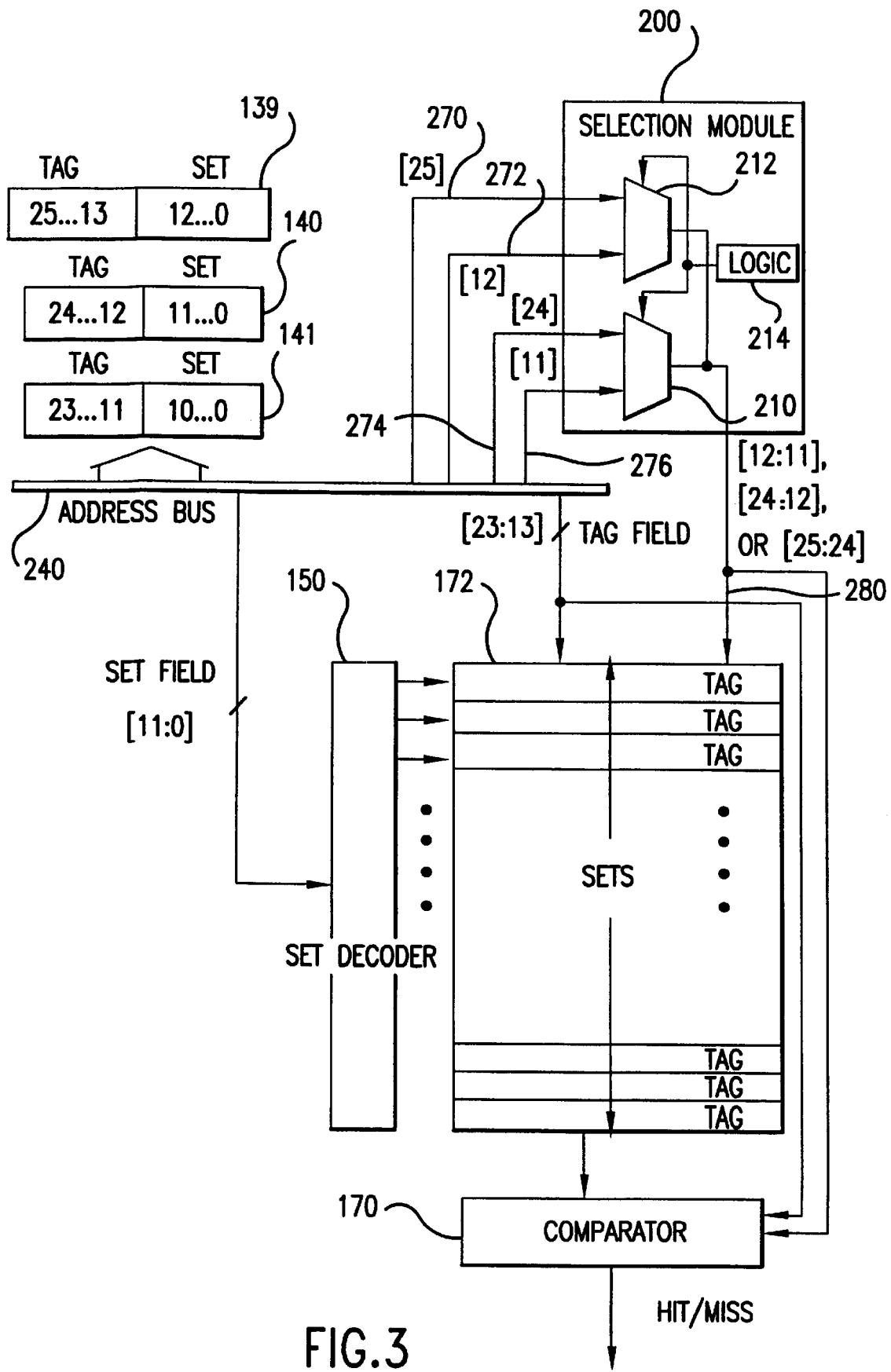
FIG. 3 is a detailed block diagram of a tag RAM in accordance with another embodiment of the present invention.

FIG. 3 is a detailed block diagram of tag RAM 116 of FIG. 1 in accordance with another embodiment of the present invention. In the embodiment of FIG. 3, the address bus 240 carries a 24–26 bit wide address field. The address field includes a 13 bit wide tag field. The three possible formats of the address field of address bus 240 are shown in FIG. 3. Address fields 140 and 141 are identical to the address fields of FIG. 2. Address field 139 is 26 bits wide with a 13 bit set field [12:0] and a 13 bit tag field [25:13]. The expanded bits of the address field on address bus 240 are bits [25:24] and the variable bits are bits [12:11].

A selection module 200, like selection module 160 of FIG. 2, receives as inputs the expanded bits and the variable bits. Selection module 200 includes a multiplexer 210 and a multiplexer 212. Each multiplexer 210 and 212 receives as inputs one expanded bit and one variable bit. Multiplexer 212 receives as inputs bit [25] over line 270 and bit [12] over line 272. Multiplexer 210 receives as inputs bit [24] over line 274 and bit [11] over line 276. The outputs of multiplexers 210 and 212 are input to memory section 172 and comparator 170 over two-bit line 280.

A logic section 214 is coupled to the selector input of multiplexers 210 and 212. Logic section 214 selects the input bits of multiplexers 210 and 212 that are tag bits for all formats of the address field. Therefore, logic section 214 selects bits [12:11] if address field 141 is the input, bits [24] and [12] if address field 140 is the input, and bits [25:24] is address field 139 is the input.

As described, the tag RAM in accordance with one embodiment of the present invention is suitable for a variable width address field in which the width of the tag field remains constant. The present invention selects the tag field bits of the address field and allows the memory section of the tag RAM to be fully utilized. The present invention also supports variable cache memory sizes.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, any size address field, with any number of expanded bits, can be used with the present invention. The size of the address field dictates the number of inputs and outputs that must be included on the selection module.

What is claimed is:

1. A tag random access memory (RAM) coupled to an address bus adapted to carry a variable width address field having at least one expanded bit and at least one variable bit, said tag RAM comprising:

a tag memory section coupled to the address bus;

a comparator that has a plurality of inputs and is coupled to the address bus and said tag memory section; and a selection module coupled to the address bus to receive the at least one expanded bit and at least one variable bit as inputs, wherein the selection module is coupled to an input of said comparator to provide one of the selection module inputs as an input value to the comparator.

2. The tag RAM of claim 1, wherein said selection module comprises a logic section and a multiplexer having a selector input coupled to said logic section.

3. The tag RAM of claim 2, wherein said multiplexer receives as inputs one of said at least one expanded bit and one of said at least one variable bit.

4. The tag RAM of claim 1, wherein the address field further comprises a first plurality of bits that are received by said comparator, and wherein said selection module provides an output of at least one of said selection module inputs to said comparator.

5. The tag RAM of claim 4, wherein said selection module output and said first plurality of bits form a tag field.

6. The tag RAM of claim 5, wherein said logic section selects one or more tag field bits from said selection module inputs.

7. The tag RAM of claim 1, further comprising a set decoder coupled to the address bus.

8. The tag RAM of claim 1, wherein the address field comprises a tag field and a set field, and wherein said tag field has a fixed width.

9. The tag RAM of claim 8, wherein the tag field and set field comprise contiguous bits.

10. The tag RAM of claim 1, wherein the address field comprises tag field bits and set field bits, and wherein each of the variable bits vary between the tag field bits and the set field bits.

11. A method of operating a tag random access memory (RAM) for a cache subsystem comprising the steps of:

receiving a variable width address field that comprises one or more expanded bits, one or more variable bits, and a plurality of first tag field bits;

selecting from the expanded bits and the variable bits one or more second tag field bits based upon the cache size; and forming a tag field by combining the first tag field bits and the second tag field bits.

12. The method of claim 11, further comprising the step of:

comparing the tag field with a tag stored in a tag memory section of the tag RAM.

13. The method of claim 11, wherein the tag field comprises contiguous bits.

14. The method of claim 13, wherein said selecting step is based on the width of the address bus.

15. The method of claim 11, wherein the address field comprises a plurality of set field bits, further comprising the step of:

selecting the tag stored in the memory section based on the set field bits.

16. The method of claim 11, wherein the tag field has a fixed width.

17. A computer system comprising:

an address bus adapted to carry a variable width address field having at least one expanded bit and at least one variable bit;

a processor coupled to said address bus; and a cache subsystem coupled to said address bus;

wherein said cache subsystem comprises a tag random access memory (RAM) and a cache memory; and wherein said tag RAM comprises;

a selection module that is coupled to said address bus to receive the at least one expanded bit and at least one variable bit as inputs, wherein the selection module has an output to provide one of the selection module inputs as a selection module output value;

a memory section coupled to said address bus; and a comparator coupled to said address bus and to one of said selection module outputs.

18. The computer system of claim 17, wherein said selection module comprises:

a logic section; and a multiplexer having a selector input coupled to said logic section.

19. The computer system of claim 18, wherein said multiplexer receives as inputs one of said at least one expanded bit and one of said at least one variable bit.

20. The computer system of claim 18, wherein said logic section comprises a lookup table.

21. The computer system of claim 17, wherein the address field further comprises a first plurality of bits that are received by said comparator, and wherein said selection module provides an output of at least one of said selection module inputs to said comparator.

22. The computer system of claim 21, wherein said selection module output and said first plurality of bits form a tag field.

23. The computer system of claim 17, wherein said address field comprises tag field bits and set field bits, and wherein each of the variable bits vary between the tag field bits and me set field bits.

24. The computer system of claim 23, wherein said tag field and said set field comprise contiguous bits.

25. A tag random access memory (RAM) for a cache subsystem comprising:

means for receiving a variable width address field that comprises one or more expanded bits, one or more variable bits, and a plurality of first tag field bits;

means for selecting from the expanded bits and the variable bits one or more second tag field bits based upon the cache size; and means for forming a tag field by combining the first tag field bits and the second tag field bits.

26. The tag random access memory of claim 25, further comprising:

means for comparing the tag field with a tag stored in a tag memory section of the tag RAM.

27. The tag random access memory of claim 25, wherein the tag field comprises contiguous bits.

28. The tag random access memory of claim 25, wherein the address field comprises a plurality of set field bits, and wherein the tag random access memory further comprises means for selecting the tag stored in the memory section based on the set field bits.

29. The tag random access memory of claim 25, wherein the tag field has a fixed width.

30. The tag random access memory of claim 25, wherein said means for selecting selects based on the width of the address bus.

* * * * *

UNITED STATES PATENT AND TRADEMARK OFFICE
CERTIFICATE OF CORRECTION

PATENT NO. : 6,425,065 B2
DATED : July 23, 2002
INVENTOR(S) : DiMarco et al.

It is certified that error appears in the above-identified patent and that said Letters Patent is hereby corrected as shown below:

<u>Column 6,</u>
Line 26, delete "me" and insert -- the --;

Signed and Sealed this

Second Day of December, 2003

JAMES E. ROGAN
*Director of the United States Patent and Trademark Office*